United States Patent
Shearer

(10) Patent No.: US 10,423,920 B1
(45) Date of Patent: *Sep. 24, 2019

(54) PHYSICAL CURRENCY MANAGEMENT

(71) Applicant: Square, Inc., San Francisco, CA (US)

(72) Inventor: Douglas Justin Shearer, Alameda, CA (US)

(73) Assignee: Square, Inc., San Francisco, CA (US)

(*) Notice: Subject to any disclaimer, the term of this patent is extended or adjusted under 35 U.S.C. 154(b) by 429 days.

This patent is subject to a terminal disclaimer.

(21) Appl. No.: 14/587,418

(22) Filed: Dec. 31, 2014

(51) Int. Cl.
| G07G 1/12 | (2006.01) |
| G06Q 10/08 | (2012.01) |
| G06Q 20/20 | (2012.01) |
| G06Q 40/00 | (2012.01) |
| G07D 11/00 | (2019.01) |

(52) U.S. Cl.
CPC ....... *G06Q 10/0835* (2013.01); *G06Q 20/202* (2013.01); *G06Q 40/00* (2013.01)

(58) Field of Classification Search
CPC ........ G06Q 10/08; G06Q 20/02; G06Q 20/18; G06Q 20/389; G06Q 20/405; G07F 19/202; G07F 19/207; G07F 19/20; G08B 13/2402; G08B 13/2462; G08B 13/08; G08B 13/2417; G07C 9/00182; G07C 9/00309; G07D 11/0006; G07D 11/0066
See application file for complete search history.

(56) References Cited

U.S. PATENT DOCUMENTS

| 5,907,286 | A | * | 5/1999 | Kuma | G07C 9/00142 |
| | | | | | 235/379 |
| 5,924,076 | A | | 7/1999 | Carr et al. | |
| 6,356,196 | B1 | * | 3/2002 | Wong | G08B 13/1427 |
| | | | | | 340/539.1 |
| 8,577,802 | B1 | * | 11/2013 | Nichols | G06Q 10/08 |
| | | | | | 705/35 |
| 8,640,945 | B1 | | 2/2014 | McCormick | |
| 8,749,347 | B1 | | 6/2014 | Newman et al. | |
| 8,783,555 | B2 | * | 7/2014 | Brindley | G06Q 10/06 |
| | | | | | 235/375 |
| 9,075,979 | B1 | | 7/2015 | Queru | |
| 9,141,876 | B1 | * | 9/2015 | Jones | G06K 9/60 |
| 9,412,100 | B1 | * | 8/2016 | Shearer | G06Q 20/204 |
| 9,558,418 | B2 | * | 1/2017 | Jones | G06K 9/60 |
| 10,210,474 | B2 | * | 2/2019 | Robinson | G06F 21/62 |
| 10,229,382 | B2 | * | 3/2019 | Skaaksrud | H04W 12/06 |

(Continued)

OTHER PUBLICATIONS https://web.archive.org/web/20120402011058/http://en.wikipedia.org:80/wiki/Swedish_rounding (Year: 2012).*

(Continued)

*Primary Examiner* — Nathan C Uber
*Assistant Examiner* — Dana Amsdell
(74) *Attorney, Agent, or Firm* — Lee & Hayes, P.C.

(57) ABSTRACT

A payment service system may operate to handle physical currency management for one or more merchants. The payment service system may assign a courier to pickup a currency storage compartment of a merchant. The payment service may then receive a notification related to the arrival of the courier at the location of the currency storage compartment and transfer funds to an account of the merchant. After transferring the funds, the payment service system may then request the merchant device to allow pickup of the currency storage compartment by the courier.

20 Claims, 8 Drawing Sheets

(56) References Cited

U.S. PATENT DOCUMENTS

| | | | |
|---|---|---|---|
| 2001/0050615 A1* | 12/2001 | Kucharczyk | A47G 29/141 340/568.1 |
| 2001/0054643 A1* | 12/2001 | Siemens | G07D 11/00 235/379 |
| 2002/0023208 A1 | 2/2002 | Jancula | |
| 2003/0001007 A1 | 1/2003 | Lee et al. | |
| 2004/0158539 A1 | 8/2004 | Akita et al. | |
| 2004/0222283 A1 | 11/2004 | Mastie et al. | |
| 2006/0065717 A1 | 3/2006 | Hurwitz et al. | |
| 2007/0106593 A1 | 5/2007 | Lin | |
| 2007/0240966 A1 | 10/2007 | Tabachnik | |
| 2008/0136636 A1* | 6/2008 | Forrest | G08B 13/2402 340/572.1 |
| 2008/0223930 A1* | 9/2008 | Rolland | G06Q 10/087 235/385 |
| 2009/0032580 A1* | 2/2009 | Blachowicz | G06Q 20/10 235/379 |
| 2009/0125435 A1* | 5/2009 | Cohen | G06Q 30/06 705/37 |
| 2009/0309694 A1* | 12/2009 | Nichols | G06Q 20/02 340/5.7 |
| 2009/0309729 A1* | 12/2009 | Nichols | A45C 1/10 340/568.7 |
| 2010/0127070 A1* | 5/2010 | Sanders | G07F 19/20 235/379 |
| 2011/0106681 A1* | 5/2011 | Cockerell | G06Q 10/06 705/35 |
| 2011/0258090 A1* | 10/2011 | Bosch | G06Q 10/087 705/30 |
| 2013/0066799 A1* | 3/2013 | Walters | G07D 11/36 705/333 |
| 2013/0218754 A1* | 8/2013 | Colvin | G06Q 40/00 705/39 |
| 2013/0232064 A1* | 9/2013 | Bosch | G06Q 10/087 705/43 |
| 2013/0346135 A1 | 12/2013 | Siemens et al. | |
| 2014/0040085 A1* | 2/2014 | Angus | G07D 11/12 705/35 |
| 2014/0339301 A1* | 11/2014 | Angus | G06Q 40/04 235/379 |
| 2014/0368345 A1* | 12/2014 | Dobbins | G08B 13/02 340/568.7 |
| 2015/0066564 A1 | 3/2015 | Neilan | |
| 2015/0287133 A1* | 10/2015 | Marlov | G06Q 40/00 705/35 |

OTHER PUBLICATIONS https://web.archive.org/web/20120418041643/https://en.wikipedia.org/wiki/Take_a_penny,_leave_a_penny (Year: 2012).*
https://www.amazon.com/gp/help/customer/display.html?nodeId=201532130 (Year: 2014).*
Notice of Allowance dated Mar. 31, 2016, for U.S. Appl. No. 14/587,385 of Shearer, D. J., filed Dec. 31, 2014.
Final Office Action dated Dec. 4, 2015, for U.S. Appl. No. 14/587,385, of Shearer, D. J., filed Dec. 31, 2014.
U.S. Appl. No. 14/587,385, of Shearer, D. J., filed Dec. 31, 2014.
U.S. Appl. No. 14/587,440, of Shearer, D. J., filed Dec. 31, 2014.
Non-Final Office Action dated Apr. 10, 2015, for U.S. Appl. No. 14/587,385, of Shearer, D. J., filed Dec. 31, 2014.
Office Action for U.S. Appl. No. 14/587,385, dated Apr. 10, 2015, Douglas Justin Shearer, "Physical Currency Management", 23 pages.
Non-Final Office Action dated Apr. 3, 2017, for U.S. Appl. No. 14/587,440, of Shearer, D.J., filed Dec. 31, 2014.
Final Office Action dated Oct. 17, 2017, for U.S. Appl. No. 14/587,440, of Shearer, D.J., filed Dec. 31, 2014.
Non-Final Office Action dated May 11, 2018, for U.S. Appl. No. 14/587,440, of Shearer, D.J., filed Dec. 31, 2014.
Final Office Action dated Nov. 2, 2018, for U.S. Appl. No. 14/587,440, of Shearer, D.J., filed Dec. 31, 2014.
Notice of Allowance dated May 9, 2019, for U.S. Appl. No. 14/587,440, of Shearer, D.J., filed Decembe 31, 2014.

* cited by examiner

300

```
┌─────────────────────────────────────────────────────────────┐
│ DETERMINE COLLECTION OF STORED CURRENCY ITEMS HAS CHANGED OR A │
│   THRESHOLD NUMBER OF TRANSACTIONS HAVE OCCURRED 302         │
└─────────────────────────────────────────────────────────────┘
                              │
                              ▼
┌─────────────────────────────────────────────────────────────┐
│   DETERMINE THE CURRENT COLLECTION OF STORED CURRENCY ITEMS 304 │
└─────────────────────────────────────────────────────────────┘
                              │
                              ▼
┌─────────────────────────────────────────────────────────────┐
│ DETERMINE TOLERANCE LEVEL FOR DEVIATION FROM PICKUP RULE IN FINDING │
│                       A MATCH 306                            │
└─────────────────────────────────────────────────────────────┘
                              │
                              ▼
┌─────────────────────────────────────────────────────────────┐
│  DETERMINE WHETHER CURRENT COLLECTION OF STORED CURRENCY ITEMS │
│   MATCHES A PICKUP RULE WITHIN TOLERANCE LEVEL 308           │
└─────────────────────────────────────────────────────────────┘
                              │
                              ▼
                        ╱ MATCHES? ╲      No
                       ╱    310     ╲─────────►  EXIT
                        ╲           ╱
                         ╲         ╱
                          Yes
                              │
                              ▼
┌─────────────────────────────────────────────────────────────┐
│            DETERMINE COURIER TO DISPATCH 312                │
└─────────────────────────────────────────────────────────────┘
                              │
                              ▼
┌─────────────────────────────────────────────────────────────┐
│     CAUSE PREPARATION OF REPLACEMENT STORAGE COMPARTMENT 314 │
└─────────────────────────────────────────────────────────────┘
                              │
                              ▼
┌─────────────────────────────────────────────────────────────┐
│ ADD DELIVERY OF REPLACEMENT STORAGE COMPARTMENT TO MERCHANT │
│ AND DELIVERY OF STORAGE COMPARTMENT TO BANK TO SCHEDULE AND PATH │
│                      OF COURIER 316                         │
└─────────────────────────────────────────────────────────────┘
```

FIG. 3

PHYSICAL CURRENCY MANAGEMENT

BACKGROUND

In today's commerce, merchants often utilize an array of different point-of-sale (POS) devices, including mobile POS devices. Merchants may use these POS devices to engage in transactions with customers. For instance, a coffee shop clerk may use a POS device to charge a customer for coffee or other items. In another example, a street vendor may use a mobile POS device to charge a customer for an item purchased from the street vendor. In some instances, the customers may pay for items with physical currency (e.g. paper notes, coins, etc.) instead of, or in combination with, other payment instruments (e.g. credit cards, debit cards, electronic payment, etc.). In addition, the merchant may need to provide change to the customer(s) in the form of physical currency when the customer does not have exact change.

Managing physical currency can pose a burden on the merchant. For example, if the merchant does not maintain a sufficient count of various denominations of the physical currency, there may be instances in which the merchant cannot provide change to the customer for a purchase. This may cause a disruption of the merchant's business and result in the loss of significant income. Conversely, if the merchant keeps more than a sufficient amount of physical currency on hand, there may be increased losses if the merchant experiences fire, theft, or other adverse events. Other difficulties in managing physical currency may result in errors, delay, and inconvenience.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

FIG. 3 is a flow diagram illustrating an example process for handling, by a payment service system, whether to schedule pickup of a currency storage compartment of a merchant device.

DETAILED DESCRIPTION

Figure 1:
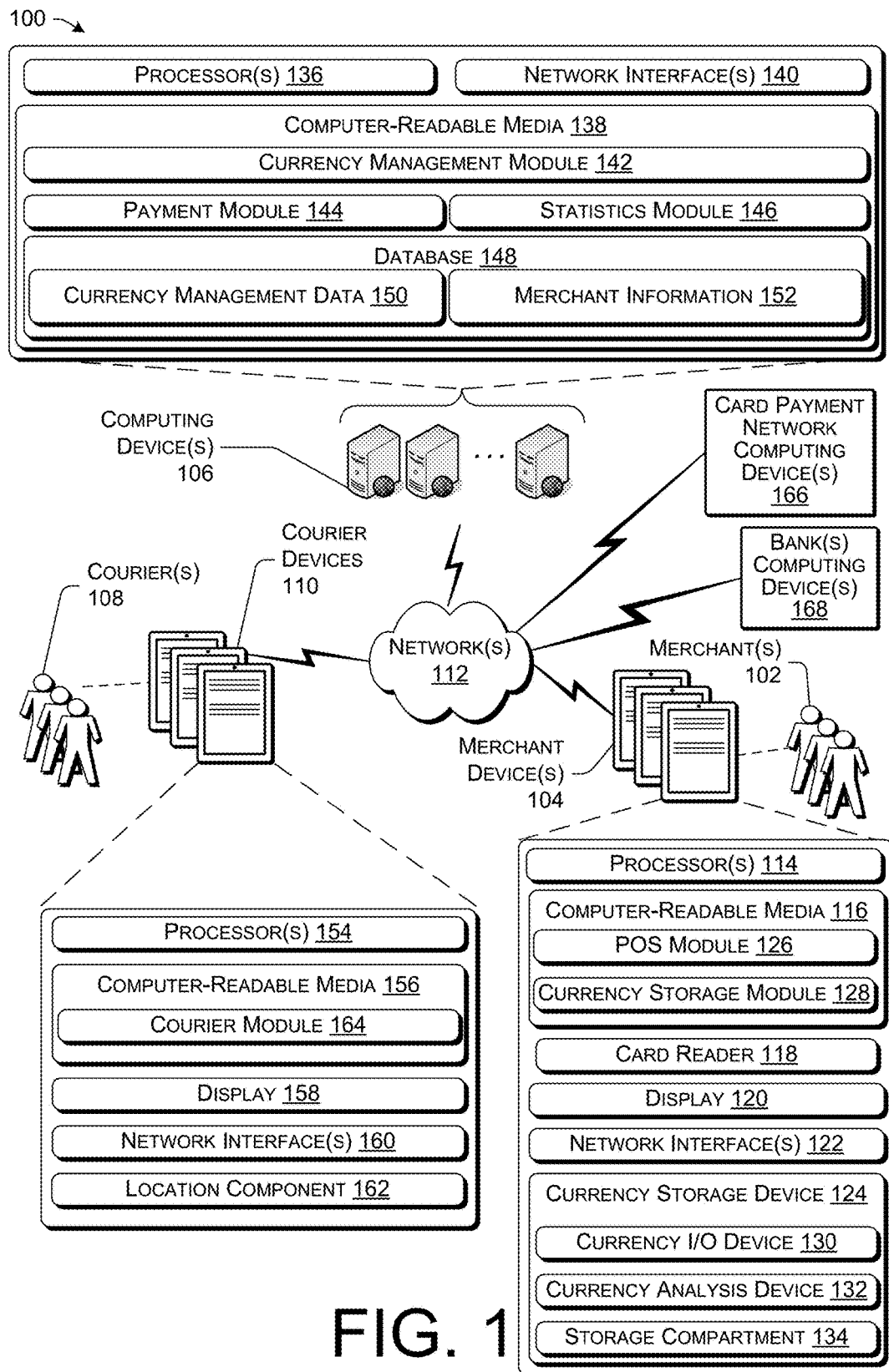
FIG. 1 illustrates an example system for handling physical currency management for one or more merchants.

This disclosure describes systems and processes for providing physical currency management for merchants. In some examples herein, the system may provide for currency management functions at a location of a merchant. Such functions may include handling of the intake of physical currency items, the storage of the physical currency items, and the provision of change to customers after transactions. For instance, some implementations according to this disclosure may provide a currency storage device that is part of, or interfaces with, a point-of-sale (POS) device of a merchant. The currency storage device of some implementations may operate to automatically accept input of physical currency items (e.g. paper notes and/or coins), automatically determine a total of the received physical currency items and output change from stored currency items.

The systems and techniques provided herein may also provide for the maintenance of the currency items stored in the currency storage device of the merchant. For instance, some implementations may include functionality to maintain the count of various denominations of currency items stored in the currency storage device. In some such implementations, the disclosed techniques may operate to request a courier pickup currency items from the merchant for deposit when an excess of currency items are stored by a currency storage device. Similarly, the disclosed techniques may operate to request a courier deliver currency items to the merchant when insufficient count(s) of one or more denominations of currency are held by the currency storage device. In some implementations, the pickup and/or delivery by the courier may configure the collection of currency items subsequently stored in the currency storage device to a predetermined initial collection of currency items. Hereinafter, both pickup and delivery are referred to as pickup. As such, a pickup of currency items of a currency storage device may involve the delivery of currency items of denominations with insufficient counts without taking any currency items away after the pickup. In addition, the disclosed techniques may provide convenience and security for merchants by transferring funds to an account of the merchant prior to the release of the physical currency to the courier. The amount of funds transferred may be based on the difference in value of the currency stored by the currency storage device before the pickup by the courier and the value of the currency stored after the pickup by the courier.

Moreover, the systems and techniques disclosed herein may analyze collected transaction information and other data from one or more merchants to determine pickup rules for the merchants and/or provide other suggestions or instructions to the merchants to alter currency item usage of the merchant. For example, transaction data of a merchant may be analyzed to derive trends in purchases, determine trends that correlate with usage of particular denominations of currency items and determine changes in the cost of one or more items provided by the merchant to mitigate usage of the particular denominations of currency items.

As such, some implementations of the systems and processes described herein may eliminate or reduce inconvenience and/or complexities for merchants associated with maintaining a suitable amount of various denominations of currency items at the merchants' locations.

Additional details and scenarios are described below. This brief introduction is provided for the reader's convenience and is not intended to limit the scope of the claims. Furthermore, the techniques described above and below may be implemented in a number of ways and in a number of contexts. Several example implementations and contexts are provided with reference to the following figures, as described below in more detail. However, the following implementations and contexts are but a few of many. For example, though discussed herein in the context of a payment service system, implementations are not so limited.

FIG. 1 illustrates an example system 100 for providing physical currency management for merchants. More particularly, FIG. 1 provides a framework for providing physical currency management for merchants in the context of a merchant's point of sale (POS) location. The POS location may be a location at which customers provide payments to the merchant in exchange for items of the merchant. Such payments may be made in various ways, such as by physical currency, point of sale operations or by using a payment service. Additional details of physical currency management operations are provided with respect to FIGS. 2-9.

As shown in FIG. 1, the system 100 may include one or more merchant(s) 102, one or more merchant devices 104 associated with the one or more merchants 102, one or more computing device(s) 106, one or more courier(s) 108, one or more courier device(s) 110 associated with the courier(s) 108 and one or more network(s) 112. In various implementations, the merchant(s) 102 may operate the merchant device(s) 104, which may include one or more processor(s) 114, one or more computer-readable media 116, a card reader 118, a display 120, network interface(s) 122 and a currency storage device 124. The computer-readable media 116 may store a POS module 126 and a currency storage module 128. The currency storage device 124 may be a smart cash drawer or similar device and include a currency input/output (I/O) device 130, a currency analysis device 132 and a storage compartment 134. The computing device(s) 106 may also include one or more processor(s) 136, computer-readable media 138 and network interface(s) 140. The computer readable media 138 may store a currency management module 142, a payment module 144, a statistics module 146 and a database 148. The database may store currency management data 150 and merchant information 152. Similarly, the courier(s) 108 may operate the courier device(s) 110, which may include one or more processor(s) 154, computer-readable media 156, a display 158, network interface(s) 160 and a location component 162. The computer-readable media 156 may store a courier module 164.

In some implementations, one of the merchants 102 may operate a merchant device 104 to perform various functions associated with the merchant device 104. For example, a merchant of the merchant (s) 102 may utilize a merchant device 104, and particularly the POS module 126 thereof, to interact with the computing devices 106 via the network interface(s) 122 to establish a merchant account with a payment service of the computing devices 106. In addition, a merchant of the merchant (s) 102 may utilize the POS module 126 of the merchant device 104 to interface with a POS module of a customer device (not shown), e.g. as part of a transaction using the payment service of the computing devices 106. For example, the merchant device 104 may communicate via the network interface(s) 122 with the customer device. As an example of such a payment operation, the POS module 126 of the merchant device 104 may communicate with the POS module of the customer device to obtain information for processing a payment from the customer to the merchant 102 using the payment service of the computing devices 106.

Further, the POS module 126 may control the operation of the card reader 118 to read payment information from credit cards, debit cards, gift cards and the like. The POS module 126 may then utilize the information to execute a payment for the transaction. Moreover, the POS module 126 may operate to interact with the card payment network computing devices(s) 166 and/or bank(s) computing device(s) 168 to execute payments from the customers to the merchant 102.

The POS module 126 may mitigate physical currency item usage as change for transactions by providing alternative ways for customers to receive change. For example, in some implementations, after receiving payment including physical currency items having a value greater than the cost of the transaction, the POS module may cause the display 120 to prompt the merchant 102 and/or a customer regarding whether the customer would like to apply the excess value toward the tip, receive a credit to an account associated with a credit card, debit card or other payment instrument, receive physical currency items as change, or some combination thereof. In an example scenario in which the customer requests the change to be returned as a credit to an account associated with a payment instrument, the customer may provide the payment means to the merchant in the same manner as for a POS transaction or electronic payment, which are described below in more detail with regard to the payment module 144.

The currency storage module 128 performs currency management operations in conjunction with the currency storage device 124, the computing device(s) 106 and the courier device(s) 110.

As stated above, in some implementations, the currency storage module 128 manages the operations of the currency storage device 124, particularly the currency I/O device 130, the currency analysis device 132 and the storage compartment 134. In some implementations, the functionality of the components of the currency storage device 124 is as follows. The currency I/O device 130 provides a mechanism for transfer of currency items in and out of the storage compartment. As a currency item is accepted by the currency I/O device 130, the currency analysis device 132 scans, or otherwise analyzes the accepted currency item to determine currency item data of the accepted currency item. Based on the currency item data, the currency storage module 128 may operate to determine the currency system to which the accepted currency item belongs and the denomination of the accepted currency item. Based on the identification of the currency item and the currency item data, the currency storage module 128 may further operate to verify the authenticity of the inserted currency item. For example, the currency storage module 128 may utilize known authenticating features of the identified denomination of the identified currency system to determine if the accepted currency item is authentic. In some implementations, information used to identify the currency system and the denomination of the accepted currency item, as well as data regarding the authenticating features may be obtained from the computing device(s) 106 or another source. If the accepted currency item is not authentic, the currency storage module 128 may instruct the currency I/O device 130 to reject the currency item. If the accepted currency item is determined to be authentic, the currency storage module 128 may instruct the currency I/O device 130 to store the accepted currency item in a designated location of the storage compartment 134. For example, the storage compartment 134 of some implementations may include storage areas for respective denominations of currency items of a primary or native currency system. In some implementations that handle currency items of foreign currency systems, an additional storage area may be reserved for non-standard currency items (currency items without dedicated storage areas). Once the currency storage module 128 has authenticated a currency item of an identified denomination and currency system, the currency storage module 128 may instruct the currency I/O device 130 to transfer the currency item to the designated storage area. In implementations that operate with respect to currency items of multiple currency systems, the currency I/O device 130 and storage area of the storage compartment 134 designated for non-standard currency items may be adapted to allow for variations in dimensions of currency items across different currency systems. Where a currency item of a foreign currency system has been accepted, identified and authenticated, the currency storage module 128 may operate to determine the value of the foreign currency item in the native currency system based on an exchange rate (e.g. the current exchange rate). In some implementations, the current exchange rate may be obtained from the payment service of the computing device(s) 106 or another source.

Once a currency item is accepted, authenticated and its value determined, the currency storage module 128 may operate to update information regarding the collection of currency items stored by the currency storage device 124. The currency storage module 128 may also inform of the POS module 126 of the receipt of a physical currency item of the determined value. The POS module 126 may then apply the value of the currency item toward, for example, the cost of a current transaction.

The currency storage module 128 may further control the currency storage device 124 to dispense currency items (e.g. as change for a purchase transaction). In some implementations, the POS module 126 may instruct the currency storage module 128 to cause the output of an amount of money, for example, as change of a purchase transaction. In response to such an instruction, the currency storage module 128 may determine the combination of currency items to be dispensed from the storage compartment 134 and instruct the currency I/O device 130 to dispense the currency items. As the currency I/O device 130 dispenses the currency items, the currency storage module 128 may update the currency storage data. Specifically, the currency storage module 128 may update the information regarding the collection of currency items stored by the currency storage device 124.

The currency storage module 128 may also operate to determine whether the collection of stored currency items in the storage compartment 134 matches a pickup rule. The specific details of pickup rules may vary from implementation to implementation as well as from merchant to merchant.

Some implementations may include pickup rules that trigger the dispatch of a courier to collect currency when the value of currency in a storage compartment 134 exceeds a fixed amount, regardless of the counts of denominations of currency stored by the storage compartment 134. For example, a merchant may define a pickup rule that instructs the payment service system of the computing devices 106 to dispatch a courier to pickup physical currency items from the merchant when the storage compartment contains more than $10,000. In some cases, the merchant may define such a rule to avoid having excessive amounts of physical currency present at the merchant location during a robbery. Further, in some implementations, the payment service system may provide the merchant with insurance on the currency stored in the storage compartment. In such a case, the payment service system may also define a pickup rule regarding the maximum amount the storage compartment is allowed to store prior to a pickup of the storage compartment being scheduled by the payment service system.

Some implementations may include pickup rules directed the counts of denominations of currency items stored by the storage compartment 134 rather than the aggregate value of the stored currency items. In some implementations, the counts of denominations the currency items of the pickup rules may be determined based on transaction data from the merchant and/or other merchants. Additional details on determining such pickup rules are described below with regard to the currency management module 142 of the computing devices 106. Other pickup rules may be manually defined by the merchant or a user of the computing device 106 associated with the payment service.

If the currency storage module 128 determines that the collection of currency items stored in the storage compartment 134 matches a pickup rule, the currency storage module 128 may transmit a request for pickup to the computing devices 106. In some implementations, the request may include information regarding the collection of stored currency items of the storage compartment 134 and/or a requested collection of currency items to be stored by the storage compartment following pickup.

When a pickup is scheduled, the currency storage module 128 may receive pickup information from the payment service of the computing devices 106. The pickup information may identify the courier (e.g. include a photo of the courier and provide identifying information such as name, a badge number, etc.), provide an estimated time of arrival for the courier and include information usable by the merchant device 104 to authenticate the presence of a courier device possessed by the identified courier.

In some implementations, the currency storage device 124, or the merchant device 104 as a whole, may include a locking mechanism that prevents the removal of the storage compartment 134. The merchant device 104 may be configured to release the locking mechanism in response to authenticating the presence of the courier device and/or receiving an input from the merchant confirming the arrival of the identified courier. In this way, some implementations may provide at least two types of verification upon which the merchant may decide to release the storage compartment 134, or the currency items contained therein, into the custody of the courier 108.

In addition, the currency storage module 128 and the system disclosed herein as a whole may provide additional confidence to the merchant when releasing the storage compartment 134 to the courier by ensuring payment to the merchant occurs prior to the release of the storage compartment 134. For example, after verifying the presence of the courier device and receiving the merchant's confirmation of the arrival of the courier, the currency storage module 128 may transmit updated currency storage data to the computing devices 106 and request funds be transferred to an account of the merchant prior release the storage compartment 134. The particular calculation for the amount of funds to be transferred may vary from implementation to implementation. For example, the amount of funds to be transferred may vary based on the procedure followed by the courier for the pickup from the merchant. More particularly, in some implementations, the courier may remove the storage compartment 134 from the currency storage device 124 and replace the storage compartment with a replacement storage compartment without transferring currency items between the storage compartments. In such a scenario, the amount credited to the merchant may be based on the difference in value of the currency items of the replaced storage compartment 134 and the value of the currency items of the replacement storage compartment (e.g. the value of the difference minus a service charge). In another example, the courier 108 may utilize a transfer device that interfaces with the currency I/O device 130 to transfer currency items in and/or out of the storage compartment 134 to configure the storage compartment 134 to the desired state. In such implementation, the amount of funds be transferred may be determined based on the difference between the state of the storage compartment 134 prior to the transfer and the desired state.

In any case, concerns of the merchant may be mitigated by the transfer of the funds prior to the release of custody of the storage compartment 134 to the courier 108 or before access is granted to the courier 108 to the storage compartment 134 by the merchant 102. Other examples of when the transfer of funds may be performed include when the courier is dispatched, when the courier arrives at the merchant location, when the courier picks up the storage compartment 134 and leaves the merchant location, when the merchant arrives at a bank, when the courier makes the deposit at the bank, or so on.

In some implementations, the merchant device 104 may be any type of device that is capable of interacting with the computing device(s) 106 and/or the courier device(s) 110. For instance, the merchant device 104 may include a personal computer, a laptop computer, a cellular telephone, a PDA, a tablet device, or any other device. The merchant device 104 shown in FIG. 1 is only one example of a merchant device 104 and is not intended to suggest any limitation as to the scope of use or functionality of any merchant device 104 utilized to perform the processes and/or procedures described herein. For example, though illustrated as a component of the merchant device(s) 104, the currency storage device 124 of some implementations may be physically separate from the merchant device 104. In some particular example implementations, the currency storage device 124 may be a smart cash drawer that is separate from but controlled by a POS device of the merchant (e.g. a smart phone or tablet). In this way, the smart cash drawer may operate to accept input of, and dispense, currency as part of the POS device of the merchant. On the other hand, the currency storage device 124 may be separate from the POS device of the merchant and controlled manually. Moreover, as discussed herein, the currency storage device 124 and storage compartment 134 are not limited to a storage device or storage compartment dedicated to a particular POS device and may instead be shared or may include of two or more physical objects (e.g. all cash register drawers of multiple merchant devices at the merchant location). For example, a storage device 124 as discussed herein may refer to a safe and the storage compartment 134 may be the interior of the safe where physical currency items are stored. Numerous other variations are possible.

In addition, some implementations according to this disclosure may not include all the functionality shown and described herein. For example, some implementations may not include the automated functionality of the currency storage device 124. Rather, such implementations may include a manual-assist denomination counter function in the currency storage module 128. Such a manual-assist denomination counter function may maintain a count of denominations of currency items included in a currency storage compartment (1) by accepting input from the merchant regarding currency items received as payment from customers and (2) by providing instructions to the merchant as to the currency items to use when providing physical change to the customer. In a more particular example, the manual-assist denomination counter function may operate such that when a customer pays a merchant in cash, the merchant may select the tendered denominations on-screen before putting them into a traditional cash drawer (e.g., customer pays $26 for a $25.94 lunch; merchant taps a $20 button, a $5 button, and a $1 button to signal the received denominations of currency. The manual-assist denomination counter function may indicate the merchant should provide one penny and one nickel to make change. At the same time, the manual-assist denomination counter function may track these changes with regard to the collection of currency stored in the traditional cash drawer. Numerous other variations are possible. For example, in some implementations, the some or all of the manual-assist denomination counter function discussed above may be handled by the computing devices 106.

In another variation, the merchant device 104 may include various other applications or modules, such as a merchant dashboard application to enable the user to control information in a merchant's profile, set merchant preferences, and so forth.

The processor(s) 114 of the merchant device 104 may execute one or more modules and/or processes to cause the merchant device 104 to perform a variety of functions, as set forth above and explained in further detail in the following disclosure. In some implementations, the processor(s) 114 may include a central processing unit (CPU), a graphics processing unit (GPU), both CPU and GPU, or other processing units or components known in the art. Additionally, each of the processor(s) 114 may possess its own local memory, which also may store program modules, program data, and/or one or more operating systems.

Depending on the exact configuration and type of the merchant device 104, the computer-readable media 116 may include volatile memory (such as RAM), non-volatile memory (such as ROM, flash memory, miniature hard drive, memory card, or the like), or some combination thereof.

In various implementations, the merchant device 104 may also have input device(s) such as a keyboard, a mouse, a pen, a voice input device, a touch input device, etc. The merchant device 104 may also include the display 120 and/or other output device(s), such as speakers, a printer, etc. The merchant 102 may utilize the foregoing features to interact with the merchant device 104, courier device(s) 110 or the computing device(s) 106 via the network(s) 112. More particularly, the display 120 of the merchant device 104 may include any type of display 120 known in the art that is configured to present (e.g., display) information to the merchant 102.

In various implementations, the one or more couriers 108 may be any individual, entity, or machine that offers products, services or the like according to the examples herein. Moreover, each of the couriers 108 may be associated with one or more courier devices 110, which may be the same as, similar to, or different from the merchant devices 104. The courier devices 110 may include any number of components such as the one or more processor(s) 154, the computer-readable media 156, the display 158, network interface(s) 160 and/or a location component 162. The couriers 108 may utilize the courier devices 110 to interact with the merchant device(s) 104 and/or computing device(s) 106 in any manner. For instance, the courier devices 110 may be used to access an interface associated with the computing device(s) 106. Continuing the above example, a merchant device 104 may utilize information obtained from interacting with the courier module 164 of the courier device 110 to verify the arrival, and identity of, the courier 108 dispatched to pickup a storage compartment 134 of the merchant by the payment service of the computing devices 106. The verification of the arrival and identity of the courier 108 may be performed through the network interface(s) 160 using location information provided by the location component 162.

The courier module 164 may provide the functionality of the courier device 110 in the physical currency management system herein. For example, the courier module 164 may utilize the one or more network interface(s) 160 to communicate with the merchant devices 104 and the computing devices 106. For example, the courier module 164 may receive a dispatch from the currency management module 142 of the computing devices 106, update a scheduled path of the courier in accordance with the dispatch and display the updated information to the courier. The courier module 164 may interact with the currency storage module 128 of the merchant devices 104 during a pickup of the storage compartment 134. In particular, as discussed above, the release of the storage compartment 134 into the custody of the courier 108 may be contingent upon an authorization of the courier device 110 executed between the currency storage module 128 and the courier module 164 using authorization information provided to the merchant device 104 by the currency management module 142 of the computing devices 106.

Similarly, the release of the storage compartment 134 into the custody of the courier 108 may be further contingent on the courier device 110 being at or within a threshold distance of the location of the merchant device 104. In some embodiments, the currency storage module 128 or currency management module 142 may restrict the release of the storage compartment 134 into the custody of the courier 108 to situations where the geographic location of the courier device 110 is within a threshold geographic distance from a geographic location of the merchant device 104. Depending on the implementation, a threshold geographic distance can be specified by the currency management module 142, by the customer, or by the merchant.

In such an implementation, determining whether the courier device 110 is within a threshold geographic distance of the merchant device 104 can be accomplished in different ways including, for example, determining whether the courier device 110 is within a threshold geographic radius of the merchant device 104, determining whether the courier device 110 is within a particular geofence, or determining whether the courier device 110 can communicate with the merchant device 104 using a specified wireless technology, e.g., Bluetooth® or Bluetooth® low energy (BLE).

Moreover, the courier module 164 may operate to provide location information generated by the location component 162 to the currency management module 142. As discussed below, the currency management module 142 may utilize the location information in monitoring the paths of the couriers 108 for irregularities and for the triggering alerts.

The courier device 110 shown in FIG. 1 is only one example of a courier device 110 and is not intended to suggest any limitation as to the scope of use or functionality of any courier device 110 utilized to perform the processes and/or procedures described herein.

While the merchant devices 104 and courier devices 110 are shown as including different modules, this is merely for ease of illustration and not intended as limiting. In various implementations, the merchant devices 104 and courier devices 110 may be identical, similar or distinct. Moreover, the modules shown and described for the merchant devices 104 and courier device 110 may be implemented as more modules or as fewer modules and functions described for the modules may be redistributed depending on the details of the implementation. Further, in some implementations, the merchant devices 104 and/or courier devices 110 may vary from device to device. In general, the merchant devices 104 and/or the courier devices 110 can each be any appropriate device operable to send and receive requests, messages, or other types of information over the one or more networks 112 or directly to each other. Additionally, in some implementation, there may be thousands, hundreds of thousands, or more, of the merchant devices 104 and the courier devices 110.

In some implementations, the network(s) 112 may be any type of network known in the art, such as a local area network or a wide area network, such as the Internet, and may include a wireless network, such as a cellular network, a local wireless network, such as Wi-Fi and/or close-range wireless communications, such as Bluetooth® and Bluetooth® low energy, near field communications (NFC), a wired network, or any other such network, or any combination thereof. Accordingly, the one or more networks 112 may include both wired and/or wireless communication technologies, including Bluetooth®, Bluetooth® low energy, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail. Consequently, the merchant devices 104, the courier devices 110, and the computing device(s) 106 may communicatively couple to the network(s) 112 in any manner, such as by a wired or wireless connection. The network(s) 112 may also facilitate communication between the merchant devices 104, the computing device(s) 106 and the courier devices 110. In turn, the network interfaces 122, 140 and 160 of the merchant devices 104, the computing device(s) 106 and the courier devices 110 may be any network interface hardware components that may allow the merchant devices 104, the computing device(s) 106 and the courier devices 110 to communicate over the network(s) 112. For example, in a particular implementation, the network interfaces 122 and 160 of the merchant devices 104 and courier devices 110 may include near field communication capabilities for performing the communications there between involved in the currency storage module 128 and courier module 164 operations.

In addition, and as mentioned previously, the computing device(s) 106 may include the one or more processor(s) 136, the computer-readable media 138 and network interface(s) 140. The computing device(s) 106 may also include additional components not listed above that may perform any function associated with the computing device(s) 106. In various implementations, the computing device(s) 106 may be any type of computing device, such as a network-accessible server, and may be one of multiple servers included in a server cluster or server farm. In other implementations, the processor(s) 136 and the computer-readable media 138 of the computing device(s) 106 may be the same as, similar to, or different from the processor(s) 114 and the computer-readable media 116, respectively, of the merchant device(s) 104. As discussed above, the computer-readable media 138 may store the currency management module 142, the payment module 144, the statistics module 146 and the database 148. The database 148 may store various information including currency management data 150 and merchant information 152. As an example, the currency management data 150 may include information about transactions between merchants 102 and customers such as the costs of the transactions, the items involved and the respective costs of the items, as well as data derived from the transaction information. The merchant information 152 may include information about the merchants 102 such as account information of the merchants 102.

In some implementations, the currency management module 142 coordinates the pickup of currency items from merchants by couriers. As explained below in more detail with regard to FIGS. 2 and 3, the pickups may be initiated by one or more of the merchants 102, the merchant devices 104 or the currency management module 142 itself. As discussed with regard to FIG. 3, the currency management module 142 provides the merchants with identification of the courier and/or other information regarding the pickup, coordinates the verification of the arrival and identity of the courier 108, and transfers funds to an account of the merchant on verification of the arrival of the courier 108. The currency management module 142 may also provide logistics support and control to the couriers 108. For example, the currency management module 142 may provide the scheduling and pathing for the couriers. More detail regarding these functions of the currency management module 142 are provided below with respect to FIG. 3. The currency management module 142 further provides for the monitoring of the couriers for deviation from the schedules and scheduled paths assigned to the couriers as well as for alerting users of the computing devices 106 of the deviation. More detail regarding these functions of the currency management module 142 are provided below with respect to FIG. 5.

The currency management module 142 further provides functionality to mitigate or alter currency usage trends by suggesting altered prices to the merchant. Another functionality of the currency management module 142 in some implementations is to avoid the projected shortfalls in currency, such as shortfalls in currency that are projected to occur prior to a scheduled pickup time. These functions of the currency management module 142 are discussed in detail in regards to FIGS. 7 and 8, respectively.

As mentioned above, the payment module 144 may handle the processing of payments. For example, the payment module 144 may handle communication with merchants 102 and/or customers to perform electronic payments using the payment service. In addition, the payment module 144 may utilize information from the database 148, such as customer account information and merchant information 152 to provide handling of payments between merchants and customers. In some implementations, the database 148 may include customer account information that may include information regarding electronic payment accounts of the customers.

As mentioned above, the payment module 144 may handle payments between merchants and users. When paying for a transaction, a customer can provide the amount of payment that is due to a merchant 102 using cash, check, a payment card, NFC, or by electronic payment through a payment service of the computing devices 106. The merchant 102 can interact with the merchant device 104 to process the transaction. In some examples, the service of the computing device 106 may handle some payments while other payments may at least at times be handled by point of sale (POS) transactions. In such cases, the point of sale may be the place where the customer interacts with the merchant 102 with merchant device 104 and executes a transaction (e.g. purchases items from a street vendor merchant or a restaurant merchant). During point-of-sale (POS) transactions, the merchant device 104 can determine and send to the computing devices 106 data describing the transactions, including, for example, services provided, item(s) being purchased, the amount of the services or item(s), buyer information, and so forth.

In some implementations, the payment service enables card-less payments, i.e., electronic payments, for transactions between the customers and the merchants 102 based on interaction of the customer with a device of the customer and interaction of the merchant 102 with the merchant device 104. Accordingly, in some examples, a card-less payment transaction may include a transaction conducted between a customer and a merchant 102 at a POS location during which an electronic payment account of the customer is charged without the customer having to physically present a payment card to the merchant 102 at the POS location. Consequently, the merchant 102 need not receive any details about the financial account of the customer for the transaction to be processed. As one example, the electronic payment may be charged to a credit card issuer or credit card number that the customer provided when signing up with the service of the computing devices 106 for an electronic payment account. As another example, the customer may have a quantity of money pre-paid in an account maintained for use in making the electronic payments. Other variations will also be apparent to those of skill in the art having the benefit of the disclosure herein.

Before conducting an electronic payment transaction, the customer typically creates a customer account with the payment service of the computing devices 106. The customer can create the customer account, for example, by interacting with an application of a customer device that is configured to perform electronic payment transactions and that may execute on the customer device. When creating an electronic payment account with the service of the computing devices 106, the customer may provide an image including the face of the user, data describing a financial account of the customer (e.g., a credit card number, expiration date), and a billing address. This customer information can be securely stored by the computing devices 106, for example, as customer account information in the database 148. Further, the customer account information may be created for each customer, which may include information about the customer and transactions conducted by the customer.

To accept electronic payments for POS transactions, the merchant 102 may create a merchant account with the service of the computing devices 106 by providing information describing the merchant including, for example, a merchant name, contact information, e.g., telephone numbers, the merchant's geographic location address, and one or more financial accounts to which funds collected from customers will be deposited. This merchant information 152 can be securely stored by the service, for example, in the database 148 along with the currency management data 150. Further, a merchant profile may be created for each merchant, which may include information about the merchant and transactions conducted by the merchant.

The service of the computing devices 106 may be configured to enable electronic payments for transactions. The computing devices 106 can include one or more servers that are configured to perform securely electronic financial transactions, e.g., electronic payments for transactions between a customer and a merchant, for example, through data communicated between a customer device and the merchant device 104. Generally, when a customer and a merchant enter into an electronic payment transaction, the transaction is processed by electronically transferring funds from a financial account associated with the customer account to a financial account associated with the merchant account.

The payment module 144 may be configured to send and receive data to and from a customer device and the merchant device 104. For example, the payment module 144 can be configured to send information describing merchants to an application on the customer device using, for example, the information stored in the database 148. For example, the payment module 144 can communicate data describing the merchants 102 that are within a threshold geographic distance from a geographic location of the customer device. The data describing the merchants 102 can include, for example, a merchant name, geographic location, contact information, and an electronic catalogue, e.g., a menu that describes items that are available from the merchant.

In some embodiments, the payment module 144 is configured to determine whether a geographic location of the customer device is within a threshold geographic distance from a geographic location of the merchant device 104. The payment module 144 can determine a geographic location of the customer device using, for example, geolocation data provided by the customer device. Similarly, the payment module 144 can determine a geographic location of the merchant device 104 using, for example, geolocation data provided by the merchant device 104 or using a geographic address, e.g., street address, provided by the merchant. Depending on the implementation, the threshold geographic distance can be specified by the payment module 144, by the customer, or by the merchant.

Determining whether the customer device is within a threshold geographic distance of the merchant device 104 can be accomplished in different ways including, for example, determining whether the customer device is within a threshold geographic radius of the merchant device 104, determining whether the customer device is within a particular geofence, or determining whether the customer device can communicate with the merchant device 104 using a specified wireless technology, e.g., Bluetooth® or Bluetooth® low energy (BLE). In some embodiments, the payment module 144 restricts electronic payment transactions between the customer and the merchant 102 to situations where the geographic location of the customer device is within a threshold geographic distance from a geographic location of the merchant device 104.

The computing devices 106 can also be configured to communicate with one or more computing devices 166 of a card payment network (e.g., MasterCard®, VISA®) over the one or more networks 112 to conduct financial transactions electronically. The computing devices 106 can also communicate with one or more bank(s) computing devices 168 of one or more banks over the one or more networks 112. For example, the computing devices 106 may communicate with an acquiring bank, and/or an issuing bank, and/or a bank maintaining user accounts for electronic payments.

An acquiring bank may be a registered member of a card association (e.g., Visa®, MasterCard®), and may be part of a card payment network. An issuing bank may issue payment cards to users, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the user may use a debit card or gift card instead of a credit card, in which case, the bank computing device(s) of a bank or other institution corresponding to the debit card or gift card may receive communications regarding a transaction in which the user is participating. Additionally, there may be computing devices of other financial institutions involved in some types of transactions or in alternative system architectures, and thus, the foregoing are merely several examples for discussion purposes. In addition, the merchant device(s) 104 may perform interactions similar to those described above with regard to the computing devices 166 of a card payment network and the bank computing devices 168 when processing transactions for payment instruments that do not involve the payment service of the computing devices 106.

The customer operating the customer device that is within a threshold geographic distance of the merchant device 104 can interact with an application executed on the customer device to conduct an electronic payment transaction with the merchant 102. While interacting with the application, the customer can select the merchant 102, from a listing of merchants 102, with whom the user wants to enter into an electronic payment transaction. The customer 102 can select the merchant 102, for example, by selecting a "check in" option associated with the merchant 102. The customer device can communicate data to the computing devices 106 indicating that the customer has checked in with the merchant 102. In response, the computing devices 106 can communicate data to notify the merchant device 104 that the customer has checked in. An application executing on the merchant device 104 can notify the merchant 102 that the customer has electronically checked in with the merchant 102 through a display of the merchant device 104.

Once checked in, the customer can receive, obtain or request items, services or appointments that are available to be acquired from the merchant 102. When the customer is ready to enter into the card-less payment transaction, the customer can, for example, approach a point of sale for the merchant 102 and identify him or herself. For example, the customer can verbally notify the merchant 102 that the customer wants to enter into a card-less payment transaction and can provide the merchant 102 with the customer's name. The merchant 102 can then interact with the application executing on the merchant's device to select the customer, from a listing of customers that have checked in with the merchant 102, to initiate an electronic payment transaction for the item(s) being acquired by the customer. For example, the merchant 102 can determine a total amount to charge the customer for the item(s) being acquired. The customer can verbally approve the total amount to be paid and, in response, the merchant 102 can submit a request for an electronic payment transaction for the total amount of the transaction to the computing devices 106. In response, the computing devices 106 can obtain, for example, from the customer account information, data describing a financial account associated with the electronic purchase account of the customer to which the total amount will be charged.

The computing devices 106 can then communicate with the computing device(s) 166 of a card payment network to complete an electronic payment transaction for the total amount to be charged to customer's electronic payment account. Once the electronic payment transaction is complete, the computing devices 106 can communicate data describing the electronic payment for the transaction to the customer device, e.g., as an electronic receipt, which can, for example, notify the customer of the total amount charged to the customer for the electronic payment for the transaction with the particular merchant. Further, while a mobile customer device is described in this example for purposes of explanation, additional or alternative types of devices may be used in other examples.

The statistics module 146 of the computing devices 106 operate to perform analysis of the currency management data 150 and/or other data. Such analysis may be performed to determine pickup rules, trends in currency usage by particular merchants or classes of merchants, changes in cost of one or more items to alter currency usage patterns, and so on. Example operations of the statistics module 146 are provided in additional detail with regard to FIGS. 3 and 6-8.

As mentioned above, the operations of modules 126-128, 142-146 and 164 may vary depending on functionality provided by the particular implementation. As such, the implementations are not limited to the example provided above. Additional details and example functionalities of the merchant device(s) 104, the computing devices 106 and the courier devices 110 as a whole are discussed below with regard to FIGS. 2-9.

The example processes are described in the context of the environment of FIG. 1 but are not limited to those environments. Each process described in this disclosure is illustrated as a logical flow graph, each operation of which represents a sequence of operations that can be implemented in hardware, software, or a combination thereof. In the context of software, the operations represent computer-executable instructions stored on one or more computer-readable media or embodied as one or more computer transmission media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In some implementations, the computer transmission media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

Figure 2:
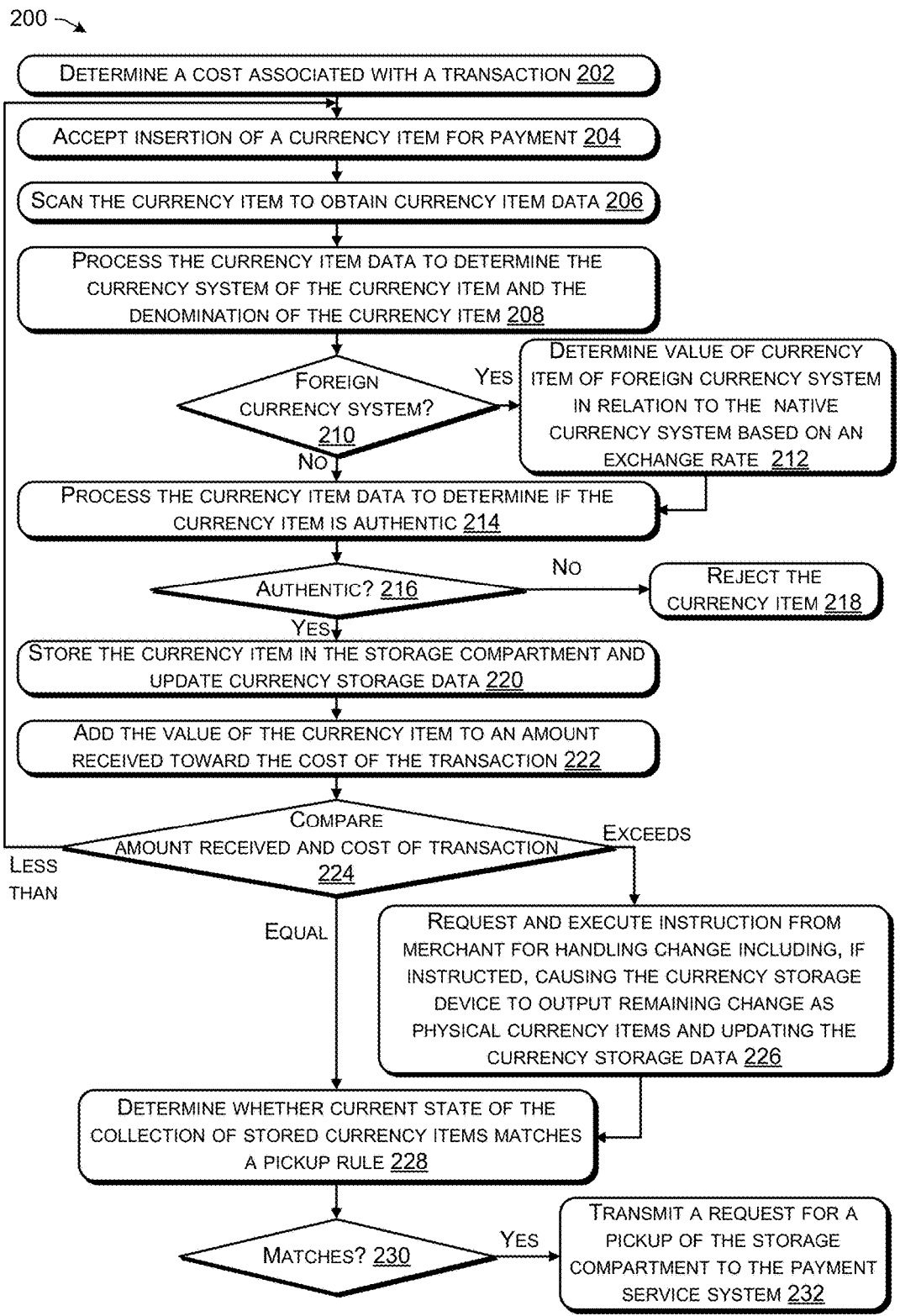
FIG. 2 is a flow diagram illustrating an example process for handling a point-of-sale (POS) transaction in which physical currency items are presented for payment and for determining whether to request a pickup of a currency storage compartment of a merchant device.

FIG. 2 is a flow diagram illustrating an example process 200 for handling a point-of-sale (POS) transaction in which physical currency items are presented for payment and for determining whether to request a pickup of a currency storage compartment of a merchant device. The following actions described with respect to FIG. 2 may be performed by the merchant device(s) 104 as shown in FIG. 1.

At 202, the POS module 126 operates to determine a cost associated with a transaction. This may be done in any number of ways. For example, the merchant 102 may enter prices for the one or more items being purchased or the merchant device 104 may include a barcode scanner or similar function. At 204, the merchant device 104 may accept insertion of at least one physical currency item for payment.

At 206, the merchant device 104 may scan the inserted currency item to obtain currency item data. The currency item data may include optical scan data, weight data, texture data or other data usable to determine the identity of the currency item. At 208, the merchant device 104 may process the currency item data to determine the currency system of the currency item and the denomination of the currency item. For example, the merchant device 104 may determine that the currency item is a United States bank note and is a note of the five dollar denomination. As mentioned above, identification data usable to identify the currency system and denomination of the currency items may be stored on the merchant device or obtained from an external source, such as the computing devices 106.

At 210, the merchant device 104 determines if the currency item is identified as being of a foreign currency system, which cannot be directly used in conjunction with the native currency system of the merchant device 104. If so, the process proceeds to 212. If the currency item is not identified as being of a foreign currency system, the process proceeds to 214.

At 212, the merchant device 104 determines the value of currency item of the foreign currency system in relation to the native currency system based on an exchange rate. In some implementations, the exchange rate may be requested and received from the payment system of the computing devices 106 or another source.

At 214, the merchant device 104 may process the currency item data to determine if the currency item is authentic. For example, the currency storage module 128 may utilize known recognizable authenticating features of the identified denomination of the identified currency system to determine if the accepted currency item is authentic. In some implementations, the authenticating features may be requested and received from the payment system of the computing devices 106 or another source.

At 216, if the currency item is not authentic, the process proceeds to 218, at which, the currency item may be rejected and returned to the customer. Otherwise, if the currency item is authentic, the process proceeds to 220. At 220, the merchant device 104 stores the currency item in a currency storage compartment and updates the currency storage data that represents the state of the currency storage compartment.

At 222, the merchant device 104 adds the value of the currency item to an amount received toward the cost of the transaction. At 224, the merchant device 104 compares the amount received and the cost of transaction. If the amount received toward the cost of the transaction is less than the cost of the transaction, the process returns to 204 and awaits the insertion of additional currency items. If the amount received toward the cost of the transaction is equal to the cost of the transaction, the process continues to 228. Otherwise, if the amount received toward the cost of the transaction exceeds the cost of the transaction, the process continues to 226.

At 226, the merchant device 104 requests and executes an instruction from merchant 102 for handling change including, if instructed, causing the currency storage device to output remaining change as physical currency items and updating the currency storage data. Other options for providing change without the use of physical currency items may be offered to the customer as discussed above regarding FIG. 1. If physical currency items are provided as change, the merchant device 104 may operate to update the currency storage data to reflect the change in the stored currency items.

At 228, the merchant device 104 determines whether the current state of the collection of stored currency items matches a pickup rule. If the current state of the collection of stored currency items matches a pickup rule, the process continues to 232. Otherwise, the process ends. At 232, the merchant device 104 may transmit a request for a pickup of the currency storage compartment to the payment service of the computing devices 106.

The process 200 described above is only an example provided for discussion purposes. For example, though at 222, the process is illustrated to return to 204 to await insertion of additional physical currency if the amount received toward the cost of the transaction is less than the cost of the transaction, implementations are not so limited. In some implementations, the merchant device 104 may be capable of accepting payment instruments for the remainder of the transaction such that the inserted currency item is applied toward the cost of the transaction and the remainder the transaction is paid by, for example, credit card, debit card, gift card, electronic payment from the payment service and so on. Similarly, in some implementations, the merchant device may be capable of accepting a non-currency payment instrument for an initial portion of the cost of the transaction and then apply a subsequently inserted currency item toward the balance of the cost of the transaction. Numerous other variations are possible.

FIG. 3 is a flow diagram illustrating an example process 300 for handling, by a payment service system, whether to schedule pickup of a currency storage compartment of a merchant device. More particularly, the process 300 causes a pickup of a storage compartment of the merchant device to be scheduled when the collection of currency items stored by the storage compartment matches a pickup rule. The following actions described with respect to FIG. 3 may be performed by the currency management module 142 of the computing device(s) 106 as shown in FIG. 1.

At 302, the currency management module 142 of the computing devices 106 may determine that a collection of stored currency items stored by a merchant device 104 of a particular merchant has changed or that a threshold number of transactions has occurred. For example, the currency management module 142 of the computing devices 106 may receive a notification from the merchant device 104 of transactions involving receipt of physical currency items and/or dispensing of physical currency items as change.

At 304, the currency management module 142 may determine the current collection of stored currency items at the merchant device 104. For example, the computing device 106 may query the merchant device to identify the collection of stored currency items of the storage compartment 134. Alternatively, the currency management module 142 may maintain currency storage data identifying the collection stored by the storage compartment 134 and update the currency storage data based on transaction data identifying denominational currency usage at the merchant device 104.

At 306, the currency management module may determine a tolerance level for deviation from a pickup rule in finding a match of the pickup rule with the current collection of stored currency items. The tolerance level may be utilized to allow for collections at the merchant device 104 which do not fully match the pickup rule to nevertheless trigger pickup of the storage compartment 134. In some implementations, the use of a tolerance level may avoid situations in which the merchant device is within a few currency items of the pickup rule and a courier is scheduled to pass by the merchant, but, because the pickup rules are strictly enforced, no pickup by the courier is scheduled. Instead, a second courier is subsequently dispatched to pickup the storage compartment 134, which may represent a waste of resources. The determination of the tolerance level may be based on many factors or considerations. Some implementations may include considerations or parameters such as whether no courier is likely to be able to make a pickup later that day; the significance of the differences between the pickup rule and the current collection and the relative closeness to the pickup rule in light of the current convenience of making the pickup (e.g. the courier is already in the area and will be right next to the merchant location in the future).

At 308, the currency management module may determine whether a current collection of stored currency items matches a pickup rule within the tolerance level. If so, at 310, the process continues to 312. If not, the process is discontinued.

At 312, the currency management module 142 may determine a courier to dispatch based on the schedules and scheduled paths of the available couriers. The determination of the courier to dispatch may also be based on various other factors. For example, some implementations may cap the amount of currency a given courier may possess. For example, where a courier is provided with a scheduled path that leads to picking up three storage compartments 134 before being directed to a bank to deposit the picked up physical currency items, currency management module 142 may not schedule an additional pickup for the courier that is closest to the pickup location because the value of the additional currency items may increase the amount possessed by the courier above the cap. Moreover, different couriers may be assigned different caps based on various factors such as credit history, employment history with the courier service (e.g. length of time operating as a courier), etc. Other factors may be considered, such as a prioritizing of pickups based on the amount of deviation from the matched pickup rule or a prioritization assigned to pickup rules. For example, the currency management module 142 may reschedule (e.g. delay) an existing pickup that was created based on a matching of a pickup rule with significant tolerance in favor of a pickup that is being created based on an actual matching of a pickup rule or a high priority pickup rule. For example, a higher priority pickup rule may be one that is matched when the storage compartment 134 of the merchant is low on a denomination of currency. A lower priority pickup may be one that is matched when the storage compartment 134 of the merchant has an excess in value stored but sufficient numbers of each denomination to continue business operation without interruption. Numerous other variations are possible.

At 314, the currency management module 142 may cause preparation of a replacement storage compartment. Depending on the implementation, the replacement compartment may be prepared differently. In some implementations, the courier may pickup a replacement compartment that stores a specific initial collection of currency items from a central location. In such implementations, the currency management module 142 may instruct a person or device at the central location to prepare the replacement compartment for pickup by the courier. In other implementations, the courier may be instructed to prepare the replacement compartment. In implementations in which the courier prepares the replacement compartment, the courier may be directed to pickup currency items from a bank or other location and add the currency items to the replacement compartment. In other implementations, the courier may already be carrying a supply of currency items that may be used to prepare the replacement compartment.

Depending on the implementation, the replacement compartment may be prepared manually, by an automated process or a mix thereof. In case of manual preparation, the preparer may have a means to open the replacement storage compartment and manually load the currency items. In the case of an automated process, the preparer may engage the replacement storage compartment to a device that automatically inputs the initial collection of currency items, for example, using a similar method to the currency I/O device 130.

The specific initial collection of currency items stored by the replacement compartment may be different for different merchants. As will be discussed in more detail below, initial collections of currency items may be determined for different merchants based on denomination usage by the merchants.

At 316, the currency management module 142 may add the delivery of the replacement storage compartment to the merchant and the delivery of the picked up storage compartment to a bank or other drop off location to the schedule and scheduled path of the courier. Depending on how the replacement storage compartment is prepared, the operations of 316 may also add the pickup of the replacement storage compartment to the schedule and scheduled path of the courier.

The process 300 described above is only an example provided for discussion purposes. For example, in some implementations, the storage compartment 134 of the merchant devices may not be removed and replaced by the courier. Instead, the counts of currency items of various denominations may be manually or automatically changed. For example, the courier may supply additional currency items for denominations that the storage compartment 134 is lacking and remove currency items of denominations which the storage compartment 134 has in excess. In an example manual implementation, the courier may unlock the storage compartment 134 and manually adjust the counts of currency items. In an example automatic implementation, the courier may engage a refill device to the currency I/O device 130 such that the refill device and the currency storage device 124 exchange currency items to configure the storage compartment 134 to contain the initial collection of currency items discussed above at 314. Numerous other variations are possible.

Figure 4:
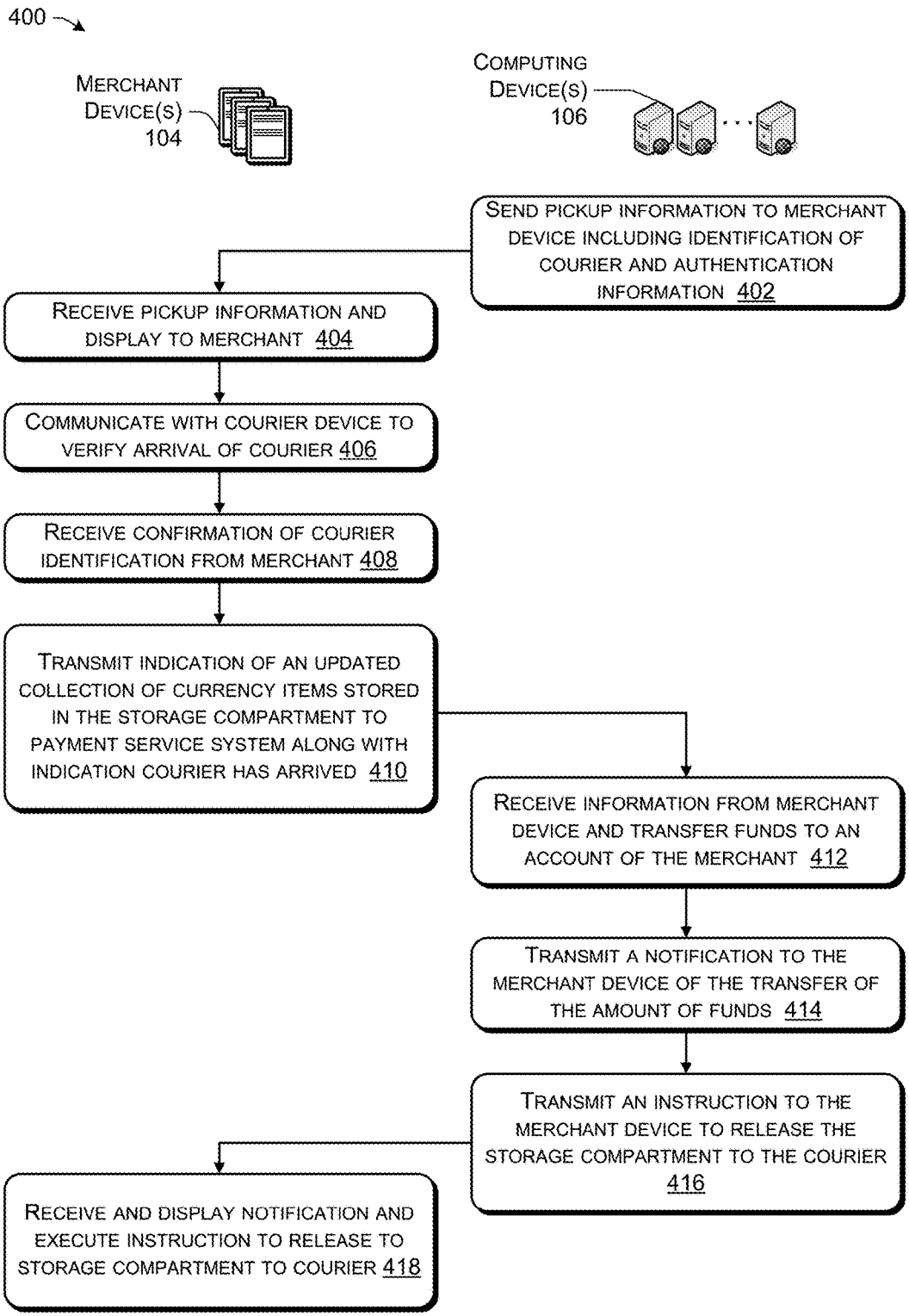
FIG. 4 is a flow diagram illustrating an example process for handling, by a payment service system and a merchant device, the pickup of a currency storage compartment of a merchant device.

FIG. 4 is a flow diagram illustrating an example process 400 for handling, by a payment service system and a merchant device, the pickup of a currency storage compartment of a merchant device. The following actions described with respect to FIG. 4 may be performed by a merchant device 104 and the computing devices 106 as shown in FIG. 1. In particular, the blocks shown below the merchant devices 104 are considered to be performed by the merchant device 104 and blocks shown below the computing devices 106 are considered to be performed by the computing devices 106. The operations of process 400 occur following the scheduling of a pickup by the courier of the storage compartment 134 of a particular merchant device 104.

At 402, the computing devices 106 send pickup information to the merchant device including courier identification information and authentication information. For example, the computing devices 106 may provide the merchant device with a photo of the courier and identifying information, such as the courier's name and an employee number of the courier. The authentication information may be information used by the merchant device 104 to verify the presence of a courier device of the courier and/or information used in a handshake process to authenticate the identification of the courier device.

At 404, the merchant device 104 receives the pickup information and displays the courier identification information to the merchant. For example, the courier identification information may be presented in a user interface displayed on the display 120 of the merchant device 104.

At 406, the merchant device 104 communicates with the courier device upon arrival of the courier at the merchant location. As mentioned above, the communication with the courier device may include a handshake process to verify the presence and authenticate the identity of the courier device of the courier. As also mentioned above, the handshake process may make use of the authentication information provided by the computing devices 106.

At 408, the merchant device 104 may prompt the merchant to verify the identity of the courier possessing the courier device. For example, a prompt may be displayed on a user interface of the merchant device showing the courier identification information and asking the merchant to confirm the person presenting the courier device is the same as shown on the user interface. The merchant device may receive input to confirm the identity of the courier. If the merchant indicates the courier does not match the courier identification information, security measures may be executed such as notifying the police of fraud and ending the process to release the storage compartment 134 into the custody of the courier.

At 410, the merchant device 104 may transmit an indication of an updated collection of currency items stored in the storage compartment to computing devices 106 of the payment service along with an indication the courier has arrived. In some implementations, the indication that the courier has arrived may also include information from the courier device to allow the computing devices 106 to verify the presence of the courier device. Alternatively, in some implementations, the courier device may communicate directly with the computing devices 106 to indicate that it has arrived at the location of the merchant device.

At 412, the computing devices 106 may receive the information transmitted by the merchant device 104 at 410. The computing device 106 may then transfer an amount of funds to or from an account of the merchant. As discussed previously, the amount of funds transferred may be based on the difference between the value of the currency stored by the storage compartment 134 at pickup and the value of the currency items stored by the replacement storage compartment delivered by the courier. Alternatively, in implementations in which the storage compartment 134 is not replaced, the amount of funds transferred may be equal to the difference in the value of the currency items stored by the storage compartment 134 before and after the pickup by the courier.

At 414, the computing devices 106 may transmit a notification to the merchant device of the transfer of the amount of funds. Additionally, at 416, the computing device 106 may transmit an instruction to the merchant device to release the storage compartment to the courier. Depending on the implementation, the instruction to release a storage compartment may cause the merchant device to release a locking mechanism holding the storage compartment within the merchant device. In other implementations, the instructions release a storage compartment may not cause the merchant device to perform an action but rather be an instruction to the merchant to release the storage compartment into the custody of the courier or otherwise allow the courier to pickup the storage compartment.

At 418, the merchant device may receive the information transmitted by the computing device 106 at 414-416. In response, the merchant device may display the notification of the transfer of funds and execute the instruction to release the storage compartment into the custody of the courier.

The process 400 described above is only an example provided for discussion purposes. Numerous other variations are possible.

Figure 5:
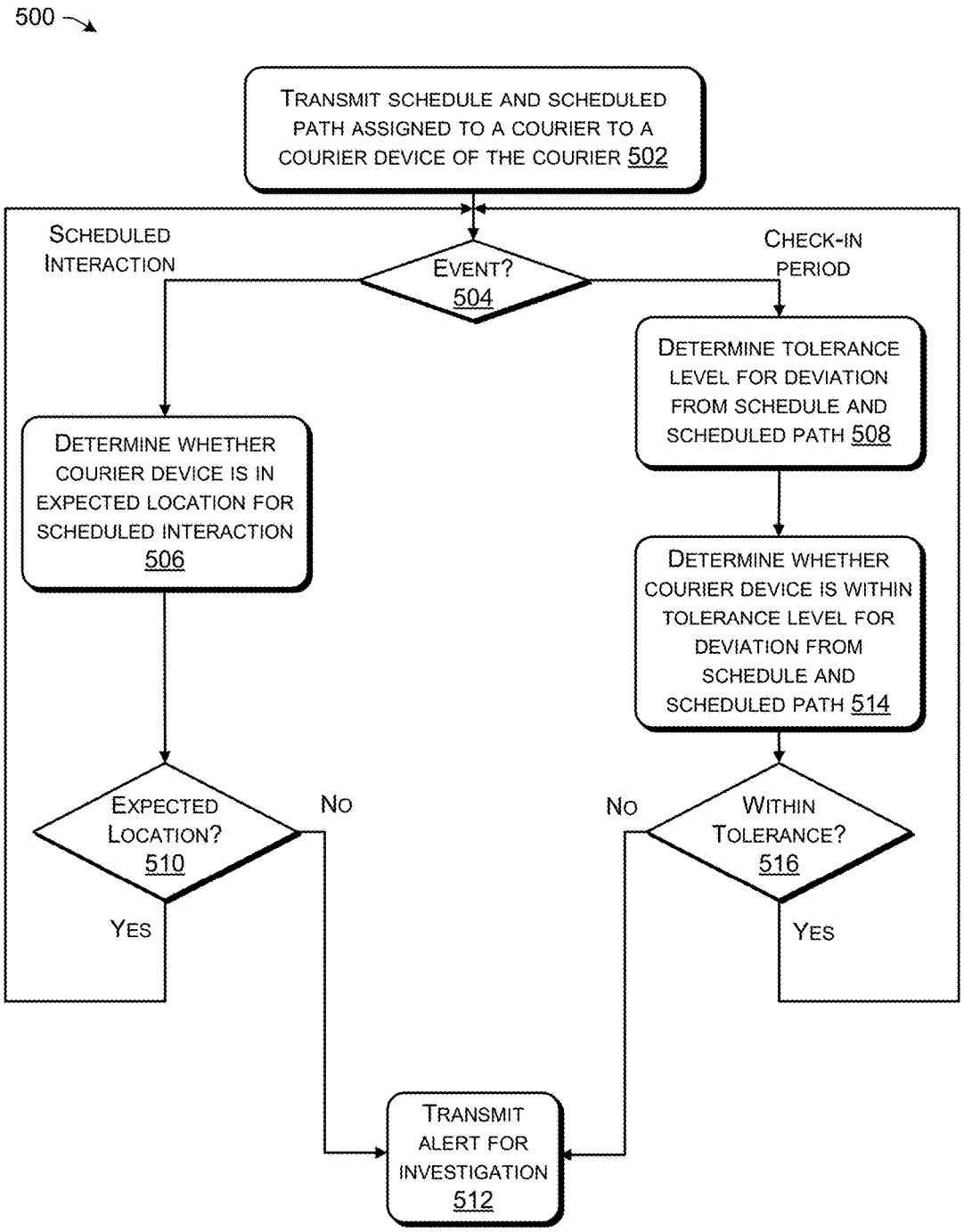
FIG. 5 is a flow diagram illustrating an example process for monitoring a courier in possession of physical currency.

FIG. 5 is a flow diagram illustrating an example process 500 for monitoring a courier in possession of physical currency. In particular, the process illustrated in FIG. 5 monitors the location of the courier to ensure the courier does not deviate from a schedule and scheduled path by (1) periodically checking the location of the courier with respect to a schedule and a scheduled path of the courier and (2) checking the location of the courier with respect to the schedule and the scheduled path at each scheduled interaction with the courier. The following actions described with respect to FIG. 5 may be performed by the computing device(s) 106 as shown in FIG. 1.

At 502, the computing devices 106 may transmit schedule information to the courier device of the courier including a schedule and a scheduled path assigned to a courier. At 504, the computing devices 106 await the occurrence of an event. If a scheduled interaction with the courier device occurs, the process moves to 506. Alternatively, if a check in period expires, the process moves to 508. As mentioned above, the events considered in FIG. 5 are periodic check ins and schedule interactions with the courier device. These are merely examples of events and other and/or additional events may be monitored.

At 506, the courier device determines whether the courier devices are in the expected location for the scheduled interaction. For example, the scheduled interaction may be an interaction between the courier device and the computing devices 106 during a delivery of currency items to the merchant. A determination that the courier is initiating the delivery of currency items at a location other than the location of the merchant may be an indication of fraud or error on the part of the courier. Of course, interaction between the courier device and the computing devices during the delivery of currency items to a merchant is merely an example interaction. Any other interaction for which the courier device should be in a defined location may also be used for monitoring the courier.

At 510, if the courier device is at the expected location, the process returns to 504 and awaits the next event. Otherwise, the process continues to 512.

At 512, the computing devices 106 may transmit an alert for investigation. Depending on various factors such as the type of interaction, the type of alert may be different. For example, the interaction may be a delivery of currency items that includes unlocking a refill device storage compartment carried by the courier for manually refilling the storage compartment 134 of the merchant device 104. In such a scenario, the courier device being in an unexpected location may indicate the courier is attempting to fraudulently take the currency items. As such, the alert may be a security action such as summoning the police to the location of the courier device or requesting an investigation by appropriate personnel of the payment service of the computing devices 106. On the other hand, the interaction may be a request for automated refilling of a replacement storage device carried by the courier by a currency dispenser. If the merchant is not at the location of the currency dispenser when the courier device requests the refilling by the currency dispenser, the likely cause is an error or mistake and not fraud. Thus, the alert may cause an administrator of the payment service of the computing devices 106 to contact the courier to ascertain the nature of the discrepancy.

Returning to 508, which is reached by the determination that a check in period has expired, the computing devices 106 determine a tolerance level for deviation from the schedule and scheduled path assigned to the courier. The monitoring occurring at 508, 514, and 516 are intended to occur at times where the courier device cannot be expected to be in a specific location. Instead, the courier device should be located along the scheduled path of assigned to the courier. Deviation from this scheduled path may indicate the courier intends to abscond with the currency items in the possession of the courier. The determination of the tolerance level may depend on various factors such as the task of the courier, whether the courier is expected to be traveling by automobile or on foot, the value of any currency items in the possession of the courier, the length and number of acceptable routes for scheduled travel by the courier, the history of the courier with the payment service, the time of day, and so on. For example, where the courier is expected to be traveling a relatively long distance by automobile where multiple acceptable routes exist, the tolerance level for deviation from the scheduled path may be relatively high. On the other hand, where the courier is expected to be on foot with few acceptable routes available, the tolerance level for deviation from the schedule that may be relatively low.

At 514, the computing devices 106 ascertain the location of the courier device and determine if the location of the courier device is within the tolerance level for deviation from the schedule and scheduled path. At 516, if the deviation of the location of the courier device is within the determined tolerance level, the process returns to 504 and awaits the next event. Otherwise, the process continues to 512.

The process 500 described above is only an example provided for discussion purposes. Numerous other variations are possible.

Figure 6:
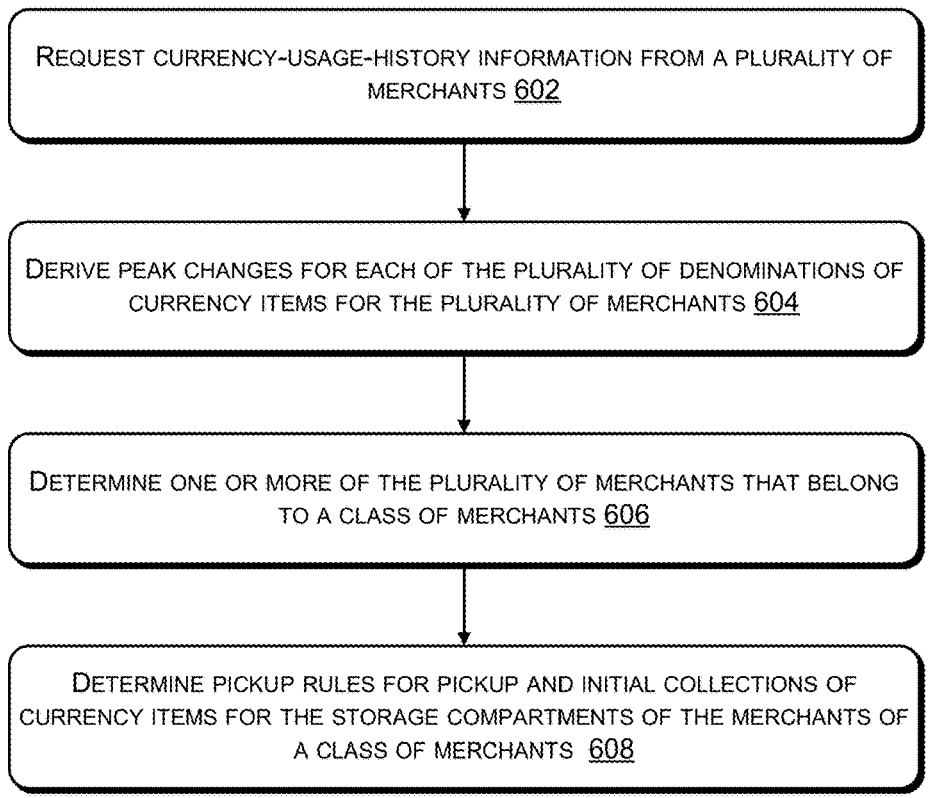
FIG. 6 is a flow diagram illustrating an example process for determining pickup rules for a currency storage compartment of a merchant device and for determining an initial collection of currency items stored by the compartment of the merchant device after pickup.

FIG. 6 is a flow diagram illustrating an example process 600 determining pickup rules for a currency storage compartment of a merchant device and for determining an initial collection of currency items stored by the compartment of the merchant device after pickup. The following actions described with respect to FIG. 6 may be performed by statistics module 146 of the computing device(s) 106 as shown in FIG. 1.

At 602, the statistics module 146 of the computing devices 106 may request currency-usage-history information from a plurality of merchants. The request may be sent directly to the merchant devices 104 or the request may be for information from the currency management data 150 stored in the database 148. The currency-usage-history information that is requested may include changes in counts of a plurality of denominations of currency items stored in the storage compartments 134 of the merchant devices of the plurality of merchants. In such an implementation, the computing devices 106 may maintain currency storage data that represents counts of one or more denominations of currency items stored in the storage compartments 134 of the merchant devices of the plurality of merchants.

At 604, the statistics module 146 may derive peak changes for each of the plurality of denominations of currency items for each of the plurality of merchants based on the currency-usage-history information. In some implementations, the peak change for individual denominations of currency items for individual merchants may indicate the difference between the greatest count and least count of the individual denomination stored in the storage compartment of the merchant device of the individual merchant over one or more time periods.

In implementations in which pickups are scheduled to occur regularly with additional pickups scheduled as needed, the time period used for determining peak changes may be the time period between the regularly scheduled pickups. In other implementations, the period may be the average period between pickups of the storage compartment (including as needed additional pickups). Other example periods for determining peak changes are a set time period (e.g. an hour, a day, etc.), the time between checks of the merchants for pickups and the time between the determination that a pickup should be made and the occurrence of the pickup. In other implementations, the determination of the peak change for a denomination may determine the greatest change in the count of the currency items of the denomination during one or more periods between previous pickups of the currency storage compartment.

At 606, the statistics module 146 may determine one or more of the plurality of merchants that belong to a class of merchants. Classes of merchants may be defined using a variety of parameters that, for example, are indicative of similarities in the likely currency usage of the merchants. Some example parameters for determining classes of merchants may include a category of merchant (e.g. coffee shop, construction company, law firm, medical office, etc.), location information, a star rating of the merchant, whether the merchants belong to a chain or franchise, native currency system, foreign currency systems used in the area of the merchant and so on.

At 608, the statistics module may determine the pickup rules and initial collections of currency items for storage compartments of the class of merchants based at least on the peak changes. In some implementations, at least some of the pickup rules are indicative of counts of one or more denominations of currency items of the collections of currency items at which pickup of the storage compartments should be scheduled. The determined counts of the pickup rules may be minimums or maximums in some implementations. For example, when the count of a particular denomination of currency items drops below the peak change for the denomination of currency item, there is a likelihood that the merchant may experience a shortage of that denomination currency without replenishment by a pickup. On the other hand, if the merchant device is storing more than, for example, double the peak change of the denomination, the excessive count of the denomination of currency items may represent a risk or waste of resources for the merchant.

The process 600 described above is only an example provided for discussion purposes. Other factors may be used to determine pickup rules and specific pickup rules may be determined for particular merchants or a smaller class of merchants. For example, peak change information and pickup rules may be determined for individual merchants with or without reliance on information about other merchants. Similarly, pickup rules may be refined for smaller classes of merchants by narrowing ranges or adding class criteria defining the class.

Other time periods for determining peak changes may be used. In an implementation in which pickups are scheduled to occur regularly and additional pickups are triggered as needed, the peak usage may be the peak usage of the denomination of currency that occurred over an amount of time equal to the remaining period of time before the periodic pickup. Alternatively, a peak usage rate per hour or per other time period may be determined for the denominations of currency and, based thereon, the peak usage for other time periods may be estimated dynamically. For example, a peak usage per hour may be used to determine an estimated peak usage In this way, a determination may be made as to whether the collection of currency items.

Numerous other variations are possible.

Figure 7:
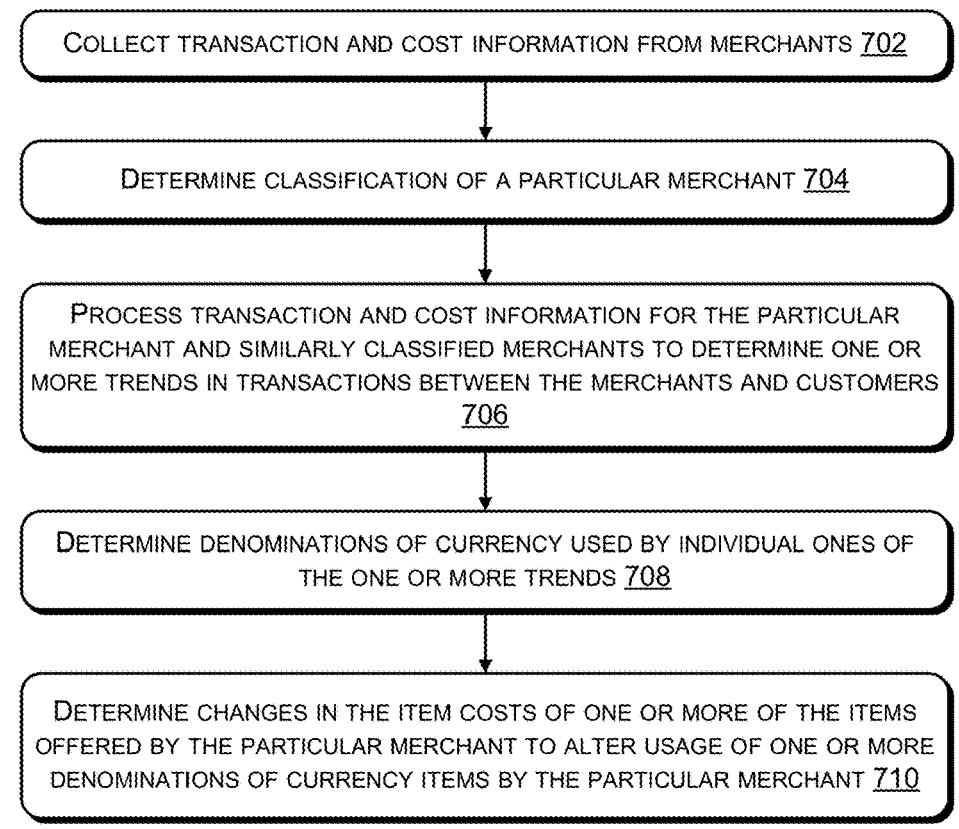
FIG. 7 is a flow diagram illustrating an example process for determining the trends in usage of denominations of currency by a particular merchant and for determining changes in costs of one or more items offered by a particular merchant to alter usage of denominations of currency by the particular merchant.

FIG. 7 is a flow diagram illustrating an example process 700 for determining the trends in usage of denominations of currency by a particular merchant and determining changes in item cost of one or more items offered by the particular merchant to alter usage of denominations of currency by the particular merchant. The following actions described with respect to FIG. 7 may be performed by the statistics module 146 of the computing device(s) 106 as shown in FIG. 1.

At 702, the statistics module 146 may collect transaction and cost information from merchant devices 104 of the one or more merchant 102. At 704, the statistics module 146 may determine a classification of a particular merchant for which cost changes to alter the denomination usage are desired.

At 706, the statistics module 146 may process transaction and cost information for the particular merchant and similarly classified merchants to determine one or more trends in transactions between the merchants and customers. For example, the statistics module 146 may determine trends such as items often purchased together, the relative frequency of the grouped purchases and so on. The items purchased together may be generalized to types of items that share prices. For example, if users often buy various flavors of coffee and a donut, a trend may be determined for the purchases even though different flavors of coffee are purchased if the various flavors of coffee share a price or for the subset of flavors that share a price.

At 708, the statistics module 146 may determine denominations of currency used by individual ones of the one or more trends. In some implementations, the statistics module 146 may determine, for a particular trend, that transactions that involve physical currency being distributed as change often uses a particular denomination of currency.

At 710, the statistics module 146 may operate to determine changes in the item costs of one or more of the items offered by the particular merchant to alter usage of one or more denominations of currency items. Such cost changes may be determined for various scenarios and may be temporary or permanent. For example, if a merchant is chronically running out of a particular denomination of currency and the statistics module determines a price change that should reduce the usage of that denomination of currency and the merchant may implement the price change permanently. On the other hand, some price changes may be made to reduce the usage of a denomination of currency which the particular merchant has a current shortage of pending the pickup of the storage compartment by a courier. In such a scenario, the price change may be determined and implemented only until the storage compartment is picked up.

The details of determining trends, the denominations of currency being used by the trends and cost changes to alter the denomination usage may vary from implementation to implementation and would be apparent to one of ordinary skill in the art in view of this disclosure. For example, in some implementations, the statistics module 146 may be configured to create a model to project future transactions and to estimate the impact of one or more cost changes using the model.

The process 700 described above is only an example provided for discussion purposes. Numerous other variations are possible.

Figure 8:
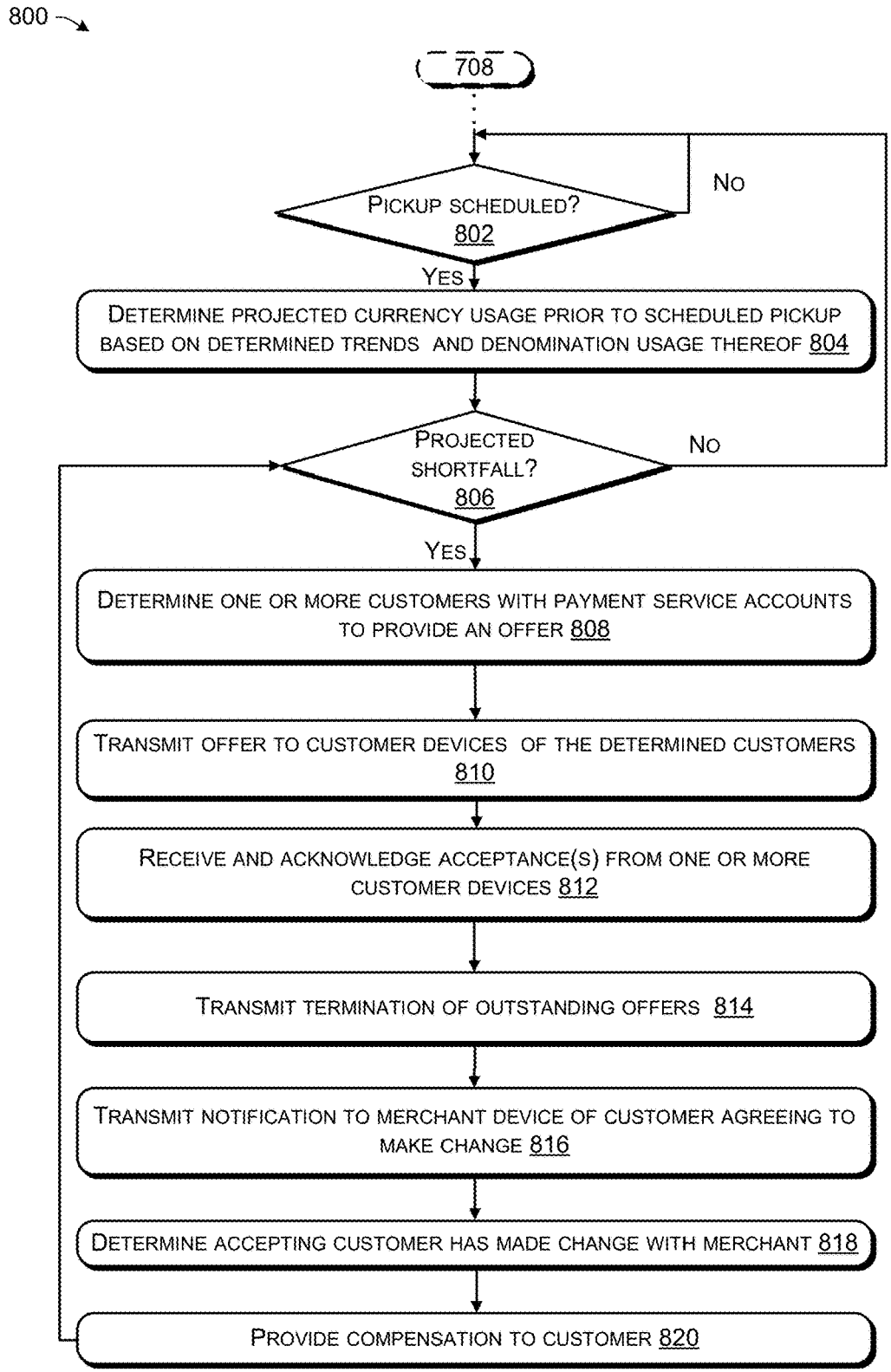
FIG. 8 is a flow diagram illustrating an example process for making offers to one or more persons that involve transactions that increase the count of a denomination of currency items stored by a currency storage compartment of a merchant device pending a pickup of the currency storage compartment by a courier.

FIG. 8 is a flow diagram illustrating an example process 800 for making offers to one or more persons that involve transactions that increase the count of a denomination of currency items stored by a currency storage compartment of a merchant device pending a pickup of the currency storage compartment by a courier. The following actions described with respect to FIG. 8 may be performed by currency management module 142 of the computing device(s) 106 as shown in FIG. 1. The example process 800 described herein is performed following operations 702-708 of FIG. 7 and may be performed separately or in combination with the operations of 710.

At 802, the currency management module 142 may await the scheduling of a storage compartment of a particular merchant and continues to 804 upon determining a pickup has been scheduled. In some implementations, the criteria to continue to 804-820 may be more specific, such as the pickup being a high priority pickup or a pickup resulting from pickup rules based on shortages of currency items.

At 804, the currency management module 142 determines a projected currency usage by the merchant prior to the scheduled pickup occurring. The determination of the projected currency usage may be based on the amount of time remaining prior to the scheduled pickup and the trends and denomination usage of the trends determined at 706-708. At 806, the currency management module 142 determines, based on the current collection of currency items stored by the storage compartment 134 of the merchant and the projected currency usage, whether a shortfall in one or more denominations of currency is likely to occur for the merchant. If a shortfall is projected to occur, the process continues to 808. If a shortfall is not projected to occur, the process returns to 802 or is discontinued.

At 808, the currency management module 142 may determine one or more customers with payment service accounts to provide an offer in return for making change with the merchant to supplement the merchant's supply of the denominations of currency of which the merchant is projected to have a shortfall. For example, the offer may provide compensation in the form of a credit for use in purchases through the payment service or may offer free or in the form of discounted products or services of the merchant projected to have a shortfall. In a particular example with a coffee shop merchant projected to have a shortfall, the offer may include a free cup of coffee in return for making change at the merchant's location. The determination of the customers may be based on various factors such as the customer having opted in to receive such offers, a location of the customer, a schedule of the customer, etc. In some implementations, the offer may include various options for making change which the customer may accept. In addition, the compensation included in the offers to the customers may be varied depending on which of the options for making change the customer accepts. For example, an option that provides the merchant with more of the denomination of currency needed by the merchant may provide a higher compensation.

At 810, the currency management module 142 may transmit the offer to customer devices of the determined customers. At 812, the currency management module 142 may receive and acknowledge acceptance(s) from one or more of the customer devices. In some implementations, the acceptance(s) may include an indication of the option for making change that the customer accepted or offered to provide.

At 814, the currency management module 142 may transmit terminations of outstanding offers. For example, in some implementations, the currency management module 142 may terminate the offer when a sufficient number of acceptances have been received to avoid the projected shortfall. In other implementations, the termination of the outstanding offers may be delayed until enough customers have actually made change to avoid the projected shortfall. In these implementations, block 814 would follow block 820.

At 816, the currency management module 142 may transmit notification(s) to the merchant device of the customer(s) accepting the offer. At 818, the currency management module 142 may determine that the accepting customer has made change with the merchant. This determination may be made in a variety of manners. For example, the merchant device may transmit a notification to the currency management module 142 based on a detection of the customer device and input from the merchant indicating change has been made by the customer.

At 820, the offered compensation is provided to the customer. Depending on the nature of the offered compensation, the currency management module 142 may request the merchant provide the compensation or, if the compensation is provided by the payment service, the currency management module 142 may provide the offered compensation.

The process 800 described above is only an example provided for discussion purposes. For example, the persons receiving the offer need not be affiliated in any way with the payment system. As such, in some systems, the person receiving the offer may be any person able to receive the offer, accept the offer and confirm performance. In other words, in some implementations, the offer may be made to persons who are not customers with accounts with the payment service. Numerous other variations are possible.

As previously stated, each of the above discussed processes is merely an example and many variations are possible. Moreover, many variations of the techniques discussed above are possible as well without departing from the scope of this disclosure.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. One or more non-transitory computer-readable media associated with one or more servers of a payment processing service, the one or more non-transitory computer-readable media storing instructions executable by one or more processors, wherein the instructions program the one or more processors to perform acts comprising:

requesting, by the one or more servers of the payment processing service and from a merchant device of a merchant, information identifying a collection of stored currency items physically stored in a currency storage compartment of a currency storage device, wherein the currency storage device is communicatively coupled to the merchant device;

determining, by the one or more servers and based on the collection of stored currency items and a pickup rule, to schedule a pickup of at least some of the stored currency items;

assigning, by the one or more servers and to a particular courier, the pickup of the at least some of the stored currency items;

receiving, at the one or more servers, a notification related to an arrival of the particular courier at a location of the currency storage compartment, the notification including information provided to the merchant device from a courier device operable by the particular courier;

transmitting, from the one or more servers and at least partly in response to the notification, an instruction to the merchant device to allow pickup of the at least some of the stored currency items in the currency storage compartment by the particular courier; and transferring, by the one or more servers upon receiving the notification, an amount of funds corresponding to the at least some of the stored currency items to an account of the merchant.

2. The one or more non-transitory computer-readable media as recited in claim 1, wherein the instructions program the one or more processors to further perform acts comprising:

determining, by the one or more servers, schedules of one or more couriers and scheduled paths of the one or more couriers, the one or more couriers including the particular courier;

determining, by the one or more servers, a pickup time for the pickup of the at least some of the stored currency items by the particular courier, the determination of the pickup time based on the collection of stored currency items, the schedules, and the scheduled paths; and adding, by the one or more servers, the pickup of the at least some of the stored currency items to the schedule and the scheduled path of the particular courier based on the pickup time.

3. The one or more non-transitory computer-readable media as recited in claim 1, wherein the instructions program the one or more processors to further perform acts comprising:

receiving, by the one or more servers, an indication of an updated collection of currency items stored in the currency storage compartment after the arrival of the particular courier at the location of the currency storage compartment; and determining, by the one or more servers, the amount of funds based at least in part on the updated collection of currency items stored in the currency storage compartment.

4. The one or more non-transitory computer-readable media as recited in claim 3, wherein the instructions program the one or more processors to further perform acts comprising:

determining, by the one or more servers, an initial collection of currency items to be stored by a replacement currency storage compartment delivered to the merchant by the particular courier; and determining, by the one or more servers, the amount of funds based on computing a difference between a value of the updated collection of currency items and a value of the initial collection of currency items.

5. The one or more non-transitory computer-readable media as recited in claim 1, wherein the pickup of the at least some of the stored currency items comprises adding or removing currency items of a denomination stored in the currency storage compartment such that a resulting count of the denomination of currency items stored in currency storage compartment is a predetermined count.

6. The one or more non-transitory computer-readable media as recited in claim 1, wherein the instructions program the one or more processors to further perform acts comprising:

projecting, by the one or more servers subsequent to the assigning of the pickup to the particular courier, a currency item usage to occur prior to the pickup;

determining, by the one or more servers and based on the projected currency item usage, a shortfall projected to occur in denominations of one or more stored currency items in the currency storage compartment; and determining, by the one or more servers, an offer of compensation that is to be provided for performing a transaction with the merchant to increase a count of the denomination of currency items projected to have the shortfall.

7. The one or more non-transitory computer-readable media as recited in claim 1, wherein the instructions program the one or more processors to further perform acts comprising:

monitoring, by the one or more servers and based at least in part on tracking a position of the courier device, a subsequent path of the particular courier following the pickup of the at least some of the stored currency items by the particular courier; and triggering, by the one or more servers, an alert for a deviation of the subsequent path of the particular courier from a schedule of the particular courier.

8. The one or more non-transitory computer-readable media as recited in claim 7, wherein the instructions program the one or more processors to further perform acts comprising:

determining, by the one or more servers, a degree of tolerance for the deviation of the subsequent path of the particular courier before triggering the alert.

9. The one or more non-transitory computer-readable media as recited in claim 1, wherein the instructions program the one or more processors to further perform acts comprising:

determining, by the one or more servers and based at least in part on tracking a position of the courier device and upon a scheduled interaction with the particular courier, whether the particular courier is at an expected location for the scheduled interaction; and triggering, by the one or more servers, an alert in response to determining that the particular courier is not at the expected location.

10. The one or more non-transitory computer-readable media as recited in claim 1, wherein the instructions program the one or more processors to further perform acts comprising authenticating, by the one or more servers, the courier device based on the information included in the notification.

11. A system comprising:

a processor; and a computer-readable medium coupled to the processor and having instructions stored thereon, which, when executed by the processor, cause the processor to perform operations comprising:

assigning, by one or more servers of a payment processing service and to a particular courier, a pickup of a currency storage compartment associated with a merchant device of a merchant, wherein the currency storage compartment stores physical currency and is communicatively coupled to the merchant device;

sending, by the one or more servers, pickup information to the merchant device, the pickup information including at least one of courier identification information or authentication information;

receiving, by the one or more servers, a notification related to an arrival of the particular courier at a location of the currency storage compartment;

authenticating, by the one or more servers, the particular courier based at least in part on the pickup information;

transmitting, by the one or more servers and based at least in part on authenticating the particular courier, a request to the merchant device to allow pickup of the currency storage compartment by the particular courier; and upon receiving the notification, modifying, by the one or more servers, an amount of funds in an account of the merchant by a value corresponding to contents of the currency storage compartment.

12. The system as recited in claim 11, the operations further comprising modifying, by the one or more servers, the amount of funds prior to transmitting the request to the merchant device.

13. The system as recited in claim 11, the operations further comprising modifying, by the one or more servers, the amount of funds at a same time as transmitting the request to the merchant device.

14. The system as recited in claim 11, the operations further comprising modifying, by the one or more servers, the amount of funds after transmitting the request to the merchant device.

15. The system as recited in claim 11, the operations further comprising:
  requesting, by the one or more servers, information from the merchant device including identification of a collection of stored currency items stored in the currency storage compartment associated with the merchant device; and
  determining, by the one or more servers and based on the collection of stored currency items and a pickup rule, to schedule the pickup of the currency storage compartment of the merchant device.

16. A method comprising:
  assigning, by one or more servers of a payment processing service and to a particular courier, a pickup of a currency storage compartment associated with a merchant device of a merchant, wherein the currency storage compartment stores physical currency items and is communicatively coupled to the merchant device;
  sending, by the one or more servers, pickup information to the merchant device, the pickup information including at least one of courier identification information or authentication information;
  receiving, by the one or more servers, a notification related to an arrival of the particular courier at a location of the currency storage compartment;
  authenticating, by the one or more servers, the particular courier based at least in part on the pickup information;
  transmitting, by the one or more servers and based at least in part on authenticating the particular courier, a request to the merchant device to allow pickup of the currency storage compartment by the particular courier; and
  modifying, by the one or more servers, an amount of funds in an account of the merchant by a value corresponding to contents of the currency storage compartment.

17. The method as recited in claim 16, further comprising:
  determining, by the one or more servers, schedules of one or more couriers and scheduled paths of the one or more couriers, the one or more couriers including the particular courier;
  determining, by the one or more servers, a pickup time for the pickup of the currency storage compartment by the particular courier based on a collection of stored physical currency items stored in the currency storage compartment, the schedules, and the scheduled paths; and
  adding, by the one or more servers, the pickup of the currency storage compartment to the schedule and the scheduled path of the particular courier based on the pickup time.

18. The method as recited in claim 16, wherein the pickup of the currency storage compartment comprises adding or removing, by the one or more servers, physical currency items of a denomination stored in the currency storage compartment such that a resulting count of the denomination stored in currency storage compartment is a predetermined count.

19. The method as recited in claim 16, wherein the notification includes information provided to the merchant device from a courier device operable by the particular courier, and further comprising:
  monitoring, by the one or more servers and based at least in part on tracking a position of the courier device, a subsequent path of the particular courier following the pickup of the currency storage compartment by the particular courier; and
  triggering, by the one or more servers, an alert for a deviation of the subsequent path of the particular courier from a schedule of the particular courier.

20. The one or more non-transitory computer-readable media as recited in claim 1, wherein the currency storage device comprises at least the currency storage compartment, a currency input/output device, and a currency analysis device.

* * * * *